United States Patent
Nishikido et al.

(10) Patent No.: US 9,397,763 B2
(45) Date of Patent: Jul. 19, 2016

(54) METHOD FOR DETECTING ABNORMALITY OF INPUT SIGNAL AND SLAVE STATION FOR USE IN SAME

(75) Inventors: Kenji Nishikido, Osaka (JP); Youichi Hoshi, Kyoto (JP); Shotaro Kusumoto, Kyoto (JP)

(73) Assignee: ANYWIRE CORPORATION, Kyoto (JP)

( * ) Notice: Subject to any disclaimer, the term of this patent is extended or adjusted under 35 U.S.C. 154(b) by 70 days.

(21) Appl. No.: 14/358,576

(22) PCT Filed: Nov. 15, 2011

(86) PCT No.: PCT/JP2011/076262
§ 371 (c)(1),
(2), (4) Date: May 15, 2014

(87) PCT Pub. No.: WO2013/073004
PCT Pub. Date: May 23, 2013

(65) Prior Publication Data
US 2014/0294053 A1    Oct. 2, 2014

(51) Int. Cl.
*H04B 17/00*    (2015.01)
*H04Q 9/00*    (2006.01)

(52) U.S. Cl.
CPC .................. *H04B 17/00* (2013.01); *H04Q 9/00* (2013.01); *H04Q 2209/823* (2013.01)

(58) Field of Classification Search
None
See application file for complete search history.

(56) References Cited

U.S. PATENT DOCUMENTS

2010/0102928 A1 *   4/2010   Chang ................... H04N 7/188
340/5.72

FOREIGN PATENT DOCUMENTS

| JP | 10-082658 | A |   | 3/1998 |
|----|-----------|---|---|--------|
| JP | H1082658  | A | * | 3/1998 |
| JP | 11-096490 | A |   | 4/1999 |
| JP | 2001-243586 | A |   | 9/2001 |
| JP | 2009-126298 | A |   | 6/2009 |
| JP | 2009126298 | A | * | 6/2009 |
| JP | 2011-114449 | A |   | 6/2011 |
| JP | 2011114449 | A | * | 6/2011 |

OTHER PUBLICATIONS

Extended European Search Report for Application No. 11 87 5963 dated Jun. 8, 2015.
Office action for Application No. 2012-531152 dated Mar. 22, 2013.
(Continued)

*Primary Examiner* — Charles C Jiang
*Assistant Examiner* — George Atkins, Jr.
(74) *Attorney, Agent, or Firm* — Pearne & Gordon LLP (57) ABSTRACT

A management data region including a plurality of pulse-like signals is included in a series of pulse-like signals output from the master station to the common data signal line, and different from a control/monitoring data region including data of a control data signal and data of a monitoring data signal. Further, when data corresponding to a signal level of an input part is larger than a lower limit threshold value and smaller than an upper limit threshold value, an abnormal state is determined to have occurred, a low sensitivity state of a signal of an input part is detected based on the determination result of the abnormal state, and a signal configuring data indicating the low sensitivity state is superimposed on the management data region.

10 Claims, 7 Drawing Sheets

(56) References Cited

OTHER PUBLICATIONS

Office action for Application No. 2012-531152 dated Nov. 15, 2012.
Office action for Application No. 2012-531152 dated Aug. 28, 2012.
Japanese Office action for Application No. 2012-531152 dated Aug. 20, 2012.
International Search Report for Application No. PCT/JP2011/076262 dated Dec. 13, 2012.

* cited by examiner

| table number | 0 | 1 | 2 | | n |
|---|---|---|---|---|---|
| IDX address data | #ad0 | #ad1 | #ad3 | | #adm |

Fig.7

METHOD FOR DETECTING ABNORMALITY OF INPUT SIGNAL AND SLAVE STATION FOR USE IN SAME

TECHNICAL FIELD

The present invention relates to a method for detecting abnormality of an input signal and a slave station for use in the method which are capable of detecting a low sensitivity state of a signal of an input unit in a slave station in a control/monitoring signal transmission system in which a master station connected to a control unit is connected with a plurality of slave stations corresponding to a plurality of controlled devices via a common data signal line for simplifying wiring of a signal line, and transmission of data is performed according to a transmission synchronization scheme such as synchronization using a transmission clock.

BACKGROUND ART

In control systems including a control unit and a plurality of controlled devices, so-called wiring saving of reducing the number of wires has been widely performed. As a general technique for wiring saving, a technique of connecting a master station with a function of performing conversion between a parallel signal and a serial signal and a plurality of slave stations with a control unit and a controlled device, respectively, and performing data transfer between the master station and the plurality of slave stations via a common data signal line using a serial signal, instead of a parallel connection of connecting each of signal lines extending from a plurality of controlled devices directly to a control unit has been widely employed.

In the case in which wiring saving is implemented, when it is difficult for a control unit side to identify a low sensitivity state of a signal of an input unit in a slave station in a state in which a number of slave stations are connected, it is necessary to check each of the slave stations far away from the control unit, and thus it requires many man-hours to detect the low sensitivity state of the signal of the input unit in the slave station.

In this regard, the present inventors have considered applying a remote wiring check system disclosed in JP 2011-114449 A as a system in which a low sensitivity state of a signal of an input unit in a slave station is identified at a control unit. In this remote wiring check system, a control/monitoring signal transmission system includes a single control unit and a plurality of controlled devices. In the system, a management data region includes connection data indicating a wiring state which is different from a control/monitoring data region including control data (output data) and monitoring data (input data) which are bidirectionally and simultaneously transmitted between a master station and a slave station connected via a wiring-saved data signal line. In the connection data, short circuit information, disconnection information, and normality information are identified. Thus, it is possible to easily check the wiring connection state of the slave station without reducing input data (monitoring data) capacity of a signal.

Further, JP 2006-331449 A discloses a slave (slave station) having a function of acquiring start time information when an ON state or an OFF state of an OUT terminal connected with an output device (output unit) has changed by OUT data received through serial communication with a master unit (master station), a function of acquiring stop time information when an ON state or an OFF state of an IN terminal connected with an input device (input unit) has changed, and a calculation function of calculating an operation period of time of the output device based on the start time information and the stop time information. According to this slave (slave station), it is possible to determine whether the output device or the input device is in the normal state, whether a replacement time has approached, or the like by obtaining the operation period of time of the output device or the input device and comparing the obtained operation period of time with setting information used for identifying a normal range of the output device or the input device.

CITATION LIST

Patent Document

Patent Document 1: JP 2011-114449 A
Patent Document 2: JP 2006-331449 A

DISCLOSURE OF THE INVENTION

Problem to be Solved by the Invention

As described above, the theoretical technique of checking the wiring connection state of the slave station in the wiring-saved system has been proposed, but in order to detect the low sensitivity state of the signal of the input unit in the slave station using this technique, a technique used to detect the low sensitivity of the input signal in the slave station is very consequential. However, there is a limitation to functions which can be mounted in the slave station of the wiring-saved system due to a relation of the size or the cost, and thus a technique of detecting the low sensitivity state in the slave station has not been now implemented yet.

It is an object of the present invention to provide a method for detecting abnormality of an input signal and a slave station for use in the method which are capable of detecting a low sensitivity state of a signal of an input unit in a slave station through a very simple configuration in a control/monitoring signal transmission system in which a master station is connected with a plurality of slave stations via common data signal line, and transmission of data is performed according to a transmission synchronization scheme.

Means for Solving Problem

According to the present invention, provided is a method for detecting abnormality of an input signal in a control/monitoring signal transmission system in which a master station is connected with a plurality of slave stations via a common data signal line, and transmission of data is performed according to a transmission synchronization scheme, the method including determining, by the slave station, occurrence of an abnormal state when data corresponding to a signal level of an input part is larger than a lower limit threshold value and smaller than an upper limit threshold value, detecting, by the slave station, a low sensitivity state of a signal of the input part based on the determination result of the abnormal state, and causing a signal configuring data indicating the low sensitivity state to be superimposed on a management data region in a transmission signal to be transmitted to the common data signal line by the slave station, the management data region being different from a control/monitoring data region comprising data of a control data signal and data of a monitoring data signal.

The slave station determines occurrence of the low sensitivity state if an integrated value of the number of determinations of the abnormal state exceeds a first threshold value.

The slave station determines occurrence of the low sensitivity state if the number of determinations of the abnormal state per predetermined period of time is larger than a second threshold value.

When the low sensitivity state of the signal of the input part is detected, the slave station transmits the transmission signal in which a signal comprising data indicating a normal state or a type of an error determined to be the low sensitivity state and data corresponding to the signal level of the input part is superimposed on the management data region to the master station.

The management data region may include a management control data region on which data from the master station is superimposed and a management monitoring data region on which data from the slave station is superimposed, data other than "0" may be used as data from the slave station to be superimposed on the management monitoring data region when the low sensitivity state is detected, and disconnection of the common data signal line may be determined if data extracted from the management monitoring data region in the master station is "0."

According to the present invention, provided is a slave station connected to the common data signal line to which the master station is connected, and includes a management control data extracting means for extracting management control data which is superimposed on a management data region by the master station, the management data region being different from a control/monitoring data region comprising data of a control data signal and data of a monitoring data signal in a transmission signal to be transmitted via a common data signal line, a management monitoring data transmitting means for causing a management monitoring data signal to be superimposed on the management data region as information from the slave station, and a low sensitivity detecting means for determining occurrence of an abnormal state when data corresponding to a signal level of an input part is larger than a lower limit threshold value and smaller than an upper limit threshold value, and transfers data indicating the low sensitivity state to the management monitoring data transmitting means if the low sensitivity state of a signal of the input part is detected based on the determination result of the abnormal state.

The low sensitivity detecting means may include a gate means, and the gate unit may output data corresponding to the signal level of the input part and data indicating the number of determinations of the abnormal state to the management monitoring data transmitting means in a switching manner.

Effect of the Invention

In the method for detecting abnormality of the input signal according to the present invention, the slave station determines occurrence of an abnormal state when data corresponding to a signal level of an input part is larger than a lower limit threshold value and smaller than an upper limit threshold value, detects a low sensitivity state of a signal of the input part based on the determination result of the abnormal state, and causes a signal configuring data indicating the low sensitivity state to be superimposed on a management data region. Thus, the master station side can detect the low sensitivity state of the signal of the input part in the slave station in the control/monitoring signal transmission system in which transmission of data is performed according to the transmission synchronization scheme.

The slave station determines the occurrence of the low sensitivity state if the integrated value of the number of determinations of the abnormal state exceeds the first threshold value. Thus, if the number of determinations of the abnormal state is large, it is possible to detect a symptom of the chronic low sensitivity state of the signal of the input part. For example, if the number of chronic low sensitivity states occurring due to a decrease in detection sensitivity of an optical light-receiving element or an integrated value of a decrease in brightness of an optical element or the number of chronic low sensitivity states occurring due to a defective connection by degradation of a signal line connecting the element with a detecting circuit exceeds the first threshold value, the occurrence of the low sensitivity state may be determined.

The slave station determines the occurrence of the low sensitivity state if the number of determinations of the abnormal state per predetermined period of time is larger than the second threshold value. Thus, if the frequency at which the occurrence of the abnormal state has been determined is large, it is possible to detect the low sensitivity state of the signal of the input part. For example, when the signal level of the input part temporarily indicates an abnormal value due to electric noise (motor noise), optical noise (scattering light), magnetic noise, or the like occurring in an ambient environment of the input part, erroneous detection is performed. The erroneous detection caused by the external noise may be determined if the number of determinations of the abnormal state per predetermined period of time is larger than the second threshold value.

When the low sensitivity state of the signal of the input part is detected, the slave station transmits the transmission signal in which a signal including data indicating a normal state or a type of an error determined to be the low sensitivity state and data corresponding to the signal level of the input part is superimposed on the management data region to the master station. Thus, the master station can detects the low sensitivity state in the slave station.

Further, if data other than "0" is used as data from the slave station to be superimposed on the management monitoring data region when the low sensitivity state is detected, information output from the slave station may not be transmitted to the master station via the common data signal line because data extracted from the management monitoring data region in the master station is "0". Thus, if "0" is extracted, the occurrence of a disconnection of the common data signal line can be determined, and it is possible to detect not only the low sensitivity state in the slave station but also the disconnection of the common data signal line.

Further, a slave station according to the present invention includes a management control data extracting means for extracting management control data which is superimposed on a management data region by the master station, the management data region being different from a control/monitoring data region comprising data of a control data signal and data of a monitoring data signal in a transmission signal to be transmitted via a common data signal line, a management monitoring data transmitting means for causing a management monitoring data signal to be superimposed on the management data region as information from the slave station, and a low sensitivity detecting means for determining occurrence of an abnormal state when data corresponding to a signal level of an input part is larger than a lower limit threshold value and smaller than an upper limit threshold value and transferring data indicating the low sensitivity state to the management monitoring data transmitting means if the low sensitivity state of a signal of the input part is detected based on the determination result of the abnormal state. Thus, the slave station according to the present invention is suitable for the method for detecting abnormality of the input signal.

Further, the low sensitivity detecting means further includes a gate means, and the gate means outputs data corresponding to the signal level of the input part and data indicating the number of determinations of the abnormal state to the management monitoring data transmitting means in a switching manner. Thus, it is possible to output the data indicating the number of determinations of the abnormal state only when the occurrence of the abnormal state is determined by monitoring the signal level of the input part.

DESCRIPTION OF THE EMBODIMENT(S)

An exemplary embodiment of a control/monitoring signal transmission system employing a method for detecting abnormality of an input signal according to the present invention will be described with reference to FIGS. 1 to 7.

Figure 2:
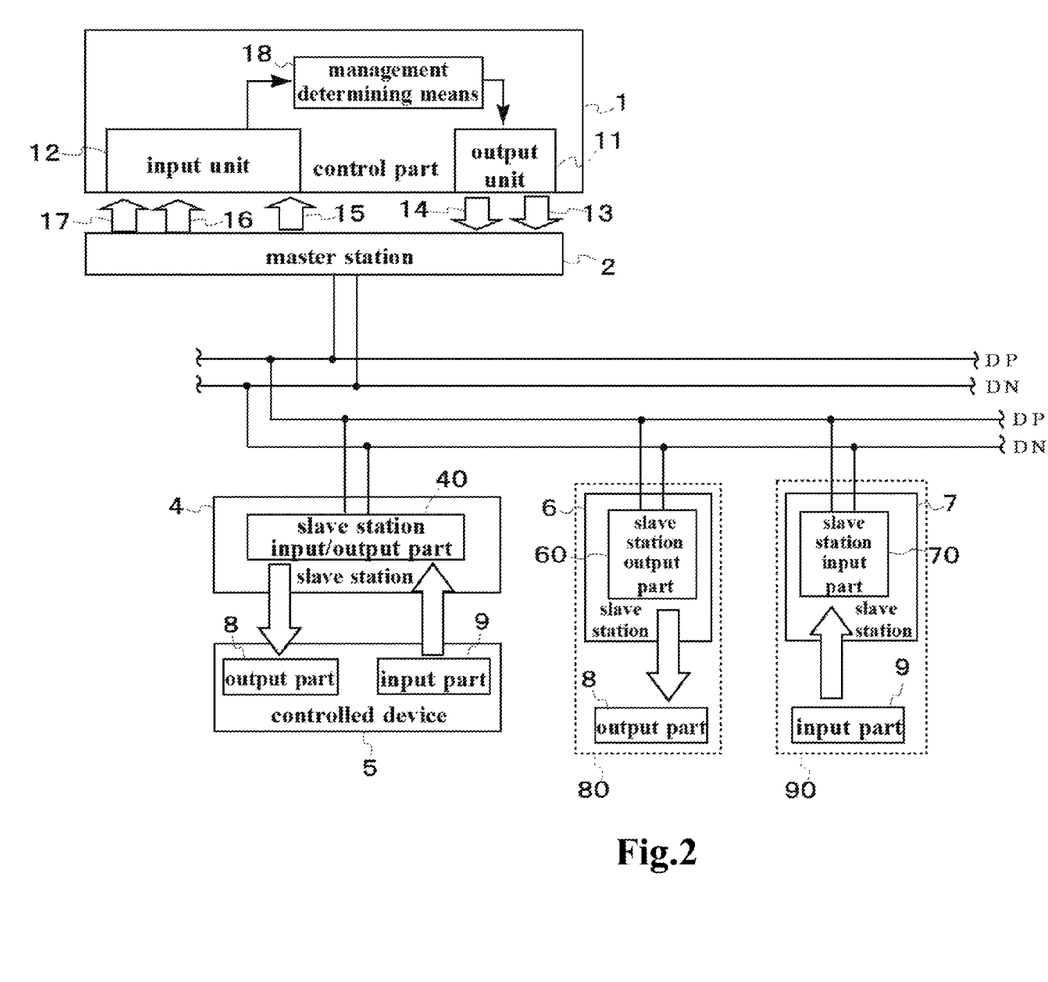
FIG. 2 is a system configuration diagram illustrating a schematic configuration of the same control/monitoring signal transmission system.

The control/monitoring signal transmission system includes a single master station 2 connected to a control part 1 and common data signal lines DP and DN (which may be hereinafter referred to as "transmission line"), and a input/output slave stations 4, a output slave station 6, and a input slave station 7 which are connected to the common data signal lines DP and DN as illustrated in FIG. 2. In FIG. 2, for convenience of illustration, one station is illustrated as each slave station, but there is no limitation to a type of a slave station or the number of slave stations connected to the common data signal lines DP and DN.

The input/output slave station 4, the output slave station 6, and the input slave station 7 perform either or both of a signal output process for an output part 8 that operates in line with an output instruction from the control part 1 and an input signal process of receiving a signal from an input part 9 that acquires input information directed to the control part 1. Examples of the output part 8 include an actuator, a (stepping) motor, a solenoid, an electromagnetic valve, a relay, a thyristor, and a lamp, and examples of the input part 9 include a reed switch, a micro switch, a push-button switch, a photoelectric switch, and various kinds of sensors. The input/output slave station 4 is connected to a controlled device 5 including the output part 8 and the input part 9, the output slave station 6 is connected only to the output part 8, and the input slave station 7 is connected only to the input part 9. The output slave station 6 may be an output unit-integrated slave station 80 in which the output part 8 is equipped, and the input slave station 7 may be an input unit-integrated slave station 90 in which the input part 9 is equipped.

Examples of the control part 1 include a programmable controller and a computer, and the control part 1 includes an output unit 11 that transmits control data 13 and management control data 14 and an input unit 12 that receives data 15 of monitoring data signals which are transmitted from the input/output slave station 4 and the input slave station 7, first management monitoring data 16, and second management monitoring data 17. The output unit 11 and the input unit 12 are connected to the master station 2. The control part 1 further includes a management determining means 18 that calculates data to be transmitted from the output unit 11 based on data received from the input unit 12.

Figure 3:
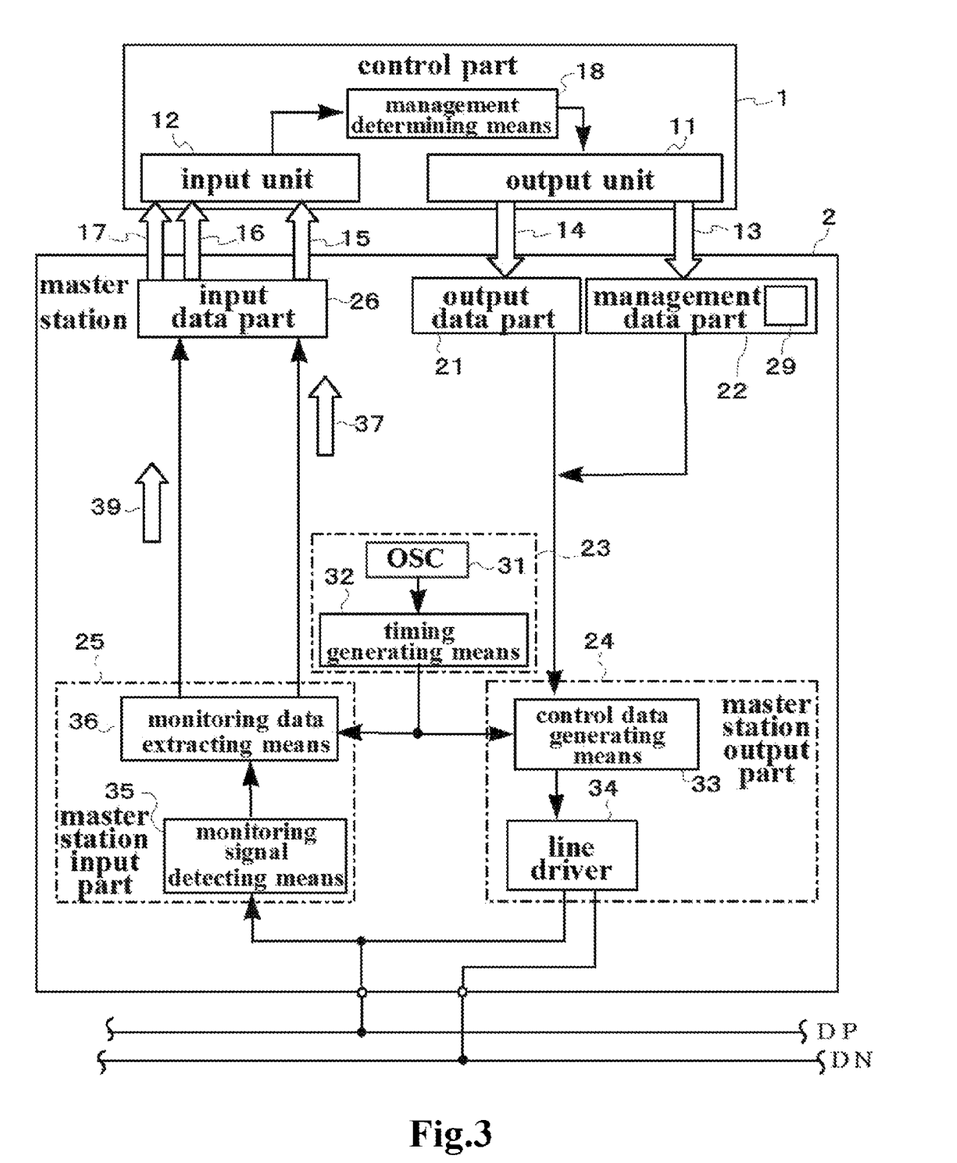
FIG. 3 is a system configuration diagram of a master station.

The master station 2 includes an output data part 21, a management data part 22, a timing generating part 23, a master station output part 24, a master station input part 25, and an input data part 26 as illustrated in FIG. 3. The master station 2 is connected to the common data signal lines DP and DN. The master station 2 transmits a control data signal (which may be hereinafter referred to as a "transmission clock signal") which is a series of pulse-like signals corresponding to a transmission signal according to the present invention to the common data signal lines DP and DN, and transmits the monitoring data 15, the first management monitoring data 16, and the second management monitoring data 17 extracted from a monitoring data signal and a management monitoring data signal transmitted from the input/output slave station 4, the output slave station 6, or the input slave station 7 (which are hereinafter referred to collectively as "slave stations 4, 6, and 7") to the input unit 12 of the control part 1.

The output data part 21 converts parallel data received from the output unit 11 of the control part 1 as the control data 13 into serial data, and transfers the serial data to the master station output part 24.

Figure 7:
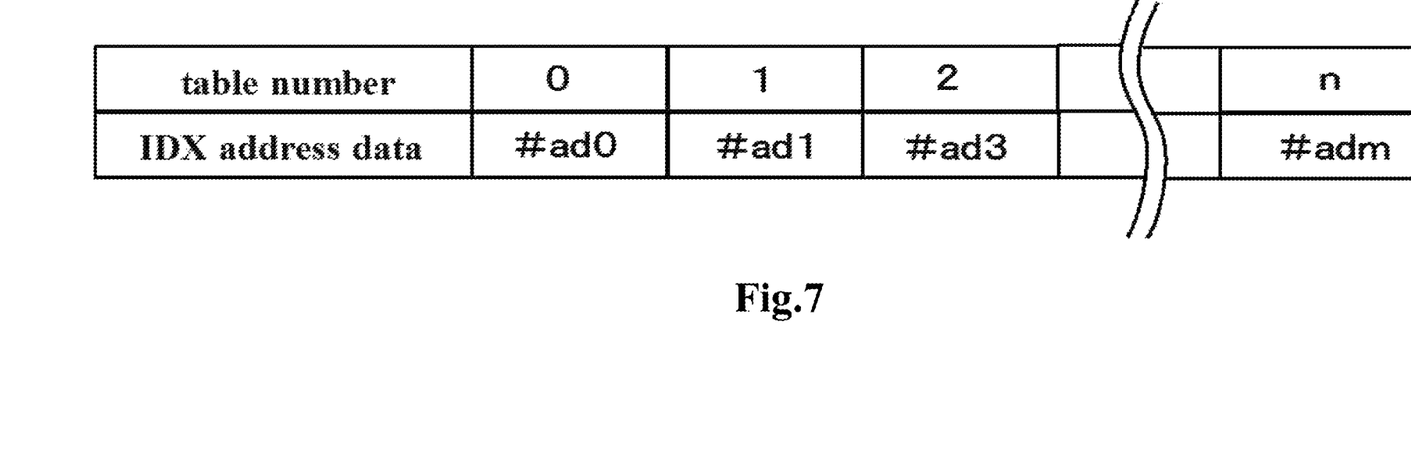
FIG. 7 is a schematic diagram of an IDX address data table stored in a master station.

The management data part 22 includes a memory 29 that stores an IDX address table in which information about each of the slave stations 4, 6, and 7 is collected. The IDX address table includes at least data used for identifying any one of the input/output slave station 4, the output slave station 6, and the input slave station 7 corresponding to the output part 8 or the input part 9 serving as a failure check target. In this embodiment, head addresses of the slave stations 4, 6, and 7 are used. FIG. 7 illustrates an exemplary IDX address table using a head address.

For a station that is allocated an address #ad0, the monitoring data signal has a 1-bit data value, and data of the IDX address table has a value in which ad0 and #ad1 are consecutive as illustrated in FIG. 7. Meanwhile, for a station that is allocated an address #ad1, the monitoring data signal has a 2-bit data value, and thus a pulse of #ad2 is also allocated to the same station as the state to which #ad1 is allocated. Thus, in data of the IDX address table, #ad3 is stored as a value next to #ad1. In this embodiment, even when the monitoring data signal has the 1-bit data value, #ad0 is also regarded as ahead address, similarly to #ad1.

The timing generating part 23 includes an oscillation circuit (OSC) 31 and a timing generating means 32. The timing generating means 32 generates a timing clock of the system based on the OSC 31, and transfers the generated timing clock to the master station output part 24.

The master station output part 24 includes a control data generating means 33 and a line driver 34. The control data generating means 33 transmits the transmission clock signal to the common data signal lines DP and DN through the line driver 34 as a series of pulse-like signals based on data received from the output data part 21 and the management data part 22, and the timing clock received from the timing generating part 23.

Figure 1:
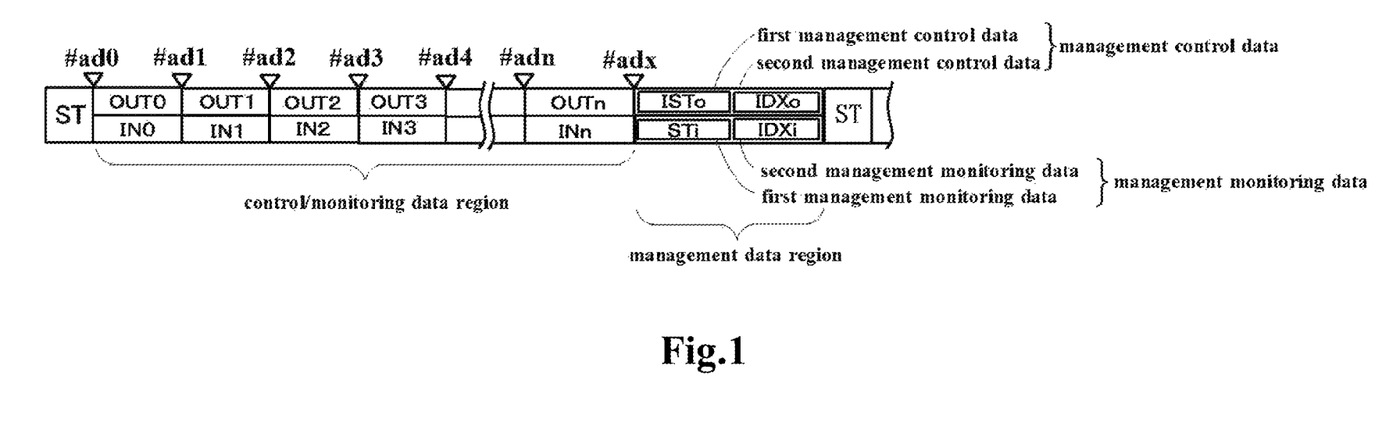
FIG. 1 is a schematic diagram illustrating a transmission scheme between a master station and a slave station in a control/monitoring signal transmission system employing a method for detecting abnormality of an input signal according to an embodiment of the present invention.
Figure 6:
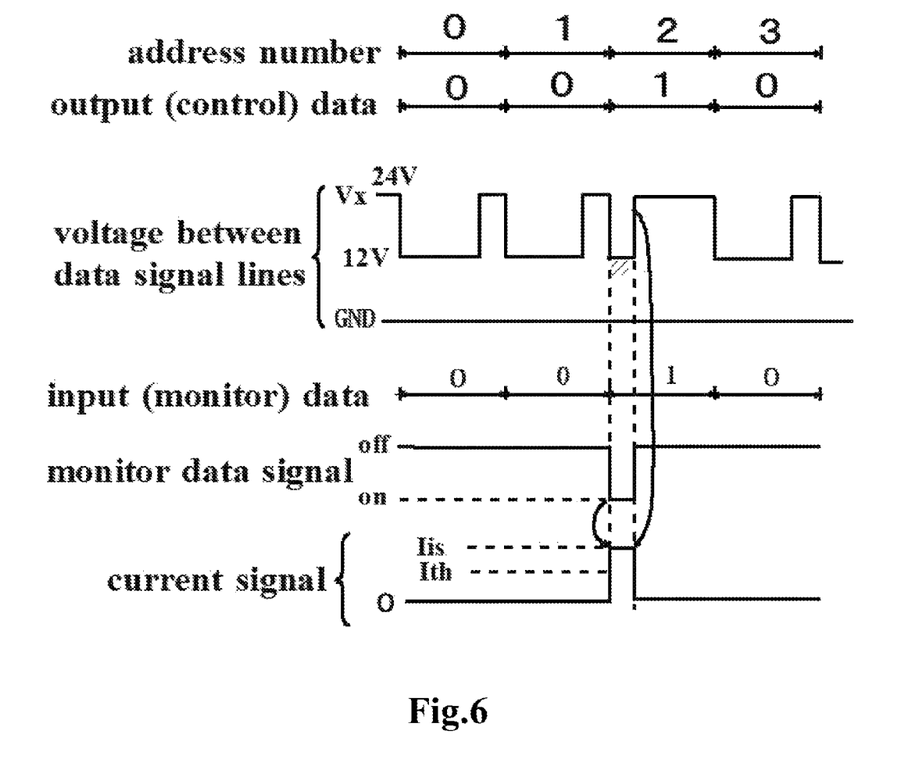
FIG. 6 is a time chart diagram of a transmission clock signal.

The transmission clock signal includes a control/monitoring data region consecutive to a start signal ST and a management data region consecutive to the control/monitoring data region as illustrated in FIG. 1. The control/monitoring data region includes data OUTn (n is an integer) of the control data signal transmitted from the master station 2 and data INn (n is an integer) of the monitoring data signal transmitted from the input/output slave station 4 or the input slave station 7. In the pulse of the transmission clock signal, as illustrated in FIG. 6, a second half of one cycle has a high potential level (+24V in this embodiment), a first half has a low potential level (+12V in this embodiment), pulse widths of the first half of the pulse having a low potential level serves as an output data period of time, and similarly, the first half of the pulse having a low potential level serves as an input data period of time. Further, the pulse widths of the low potential level indicates the data OUTn of the control data signal, and the presence or absence of an electric current to be superimposed on the low potential level indicates the data INn of the monitoring data signal. In this embodiment, when one cycle of the transmission clock signal is assumed to be t0, the pulse width of the low potential level extends from (¼) t0 to (¾) t0, the pulse width of the low potential level may be decided as needed without limitation as long as it corresponds to each data value of the control data 13 input from the control part 1. Further, it is possible to decide the input data period of time and the output data period of time, as needed. For example, similarly to this embodiment, the first half (low potential level) of the pulse may be used as the input data period of time, and the pulse width of the second half (high potential level) of the pulse may be used as the output data period of time. Similarly, the first half (low potential level) of the pulse may be used as the output data period of time, and the second half (high potential level) of the pulse may be used as the input data period of time. The second half (high potential level) of the pulse may be used as the output data period of time and the input data period of time. The same applies even when the second half of one cycle of the transmission clock signal has the low potential level. In FIG. 1, an upper part indicates the output data period of time, and a lower part indicates the input data period of time.

The management data region of the transmission clock signal includes a management control data region on which the management control data signal transmitted from the master station 2 is superimposed and a management monitoring data region on which the management monitoring data signals transmitted from the slave stations 4, 6, and 7 are superimposed. Management control data to be transmitted through the management control data signal includes a first management control data ISTo and second management control data IDXo, and is indicated by the pulse width of the low potential level, similarly to the data OUTn of the control data signal. Further, management monitoring data to be transmitted through the management monitoring data signal includes first management monitoring data STi and second management monitoring data IDXi, and is indicated by the presence or absence of an electric current to be superimposed on the low potential level, similarly to the data INn of the monitoring data signal. In this embodiment, the first management control data ISTo and the second management control data IDXo are used as instruction data identifying a type of data which the slave stations 4, 6, and 7 are requested to transmit or address data used for identifying any one of the slave stations 4, 6, and 7. Further, the first management monitoring data STi and the second management monitoring data IDXi are used as type data indicating that an input signal is in a normal sensitivity state or type data indicating abnormality in which an input signal is in a low sensitivity state and monitoring data of an input level in the normal state or the abnormal state or data indicating a result of monitoring the number of the low sensitivity states according to a type of an error, and data other than "0" is consistently transmitted as the management monitoring data. The details will be described later.

The start signal ST is a signal that has the same potential level as the high potential level of the transmission clock signal and is longer than one cycle of the transmission clock signal.

The master station input part 25 includes a monitoring signal detecting means 35 and a monitoring data extracting means 36. The monitoring signal detecting means 35 detects the monitoring data signal and the management monitoring data signal transmitted from the slave stations 4, 6, and 7 via the common data signal lines DP and DN. The data values of the monitoring data signal and the management monitoring data signal are indicated by the presence or absence of an electric current to be superimposed on the low potential level as described above, and after the start signal ST is transmitted, first, the monitoring data signals are sequentially received from the input/output slave station 4 and the input slave station 7, and then the management monitoring data signal is received from any one of the slave stations 4, 6, and 7. The monitoring data extracting means 36 extracts the data of the monitoring data signal and the management monitoring data signal in synchronization with the signal of the timing generating means 32. Then, the data of the monitoring data signal is transmitted to the input data part 26 as serial input data 37. Management monitoring data 39 extracted from the management monitoring data signal is also transmitted to the input data part 26.

The input data part 26 converts the serial input data 37 received from the master station input part 25 into parallel data, and transmits the parallel data to the input unit 12 of the control part 1 as the monitoring data 15. Further, the input data part 26 separates the management monitoring data 39 received from the master station input part 25 into the first management monitoring data 16 and the second management monitoring data 17, and transmits the first management monitoring data 16 and the second management monitoring data 17 to the input unit 12.

Figure 4:
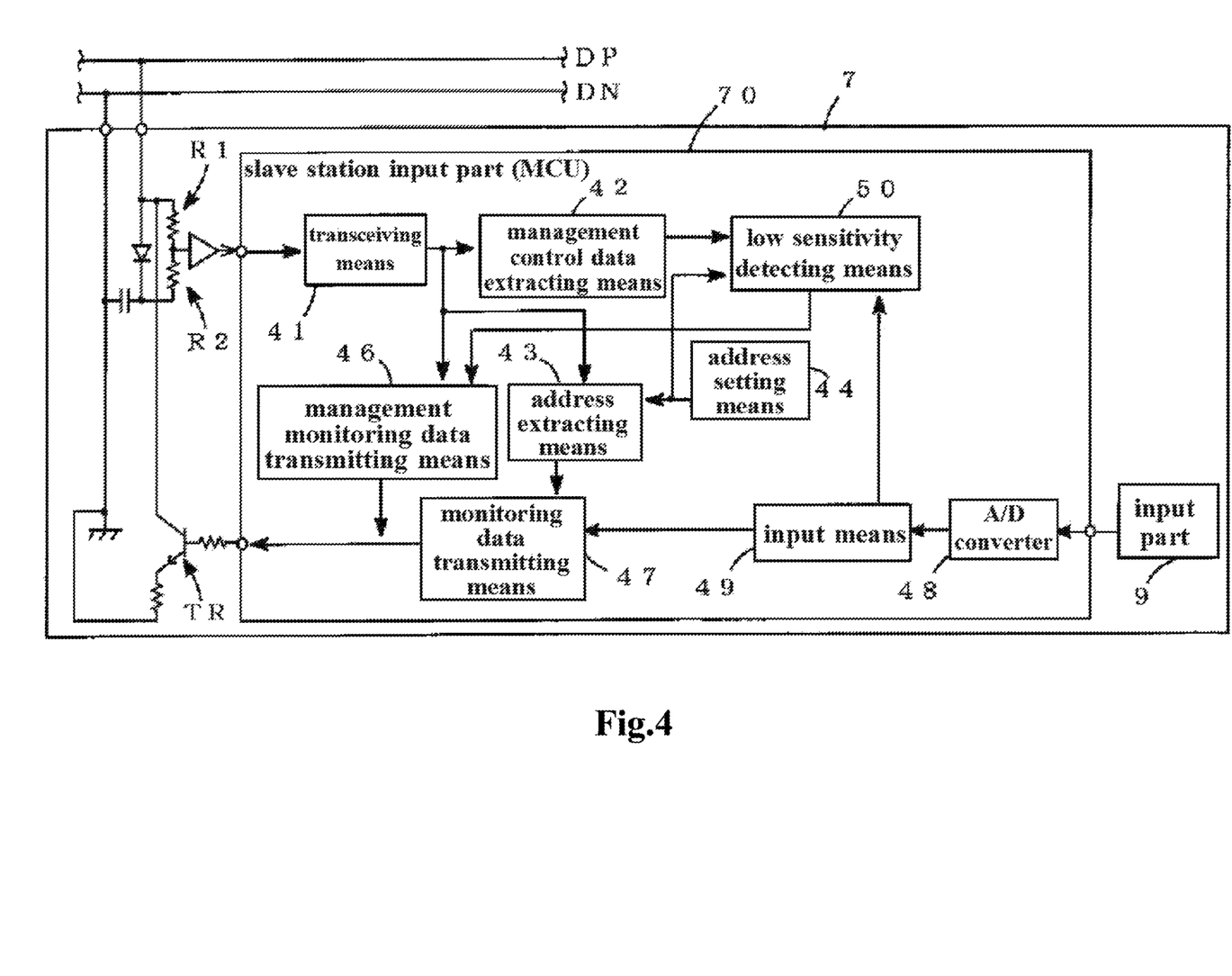
FIG. 4 is a system configuration diagram of an input/output slave station.

The input slave station 7 corresponds to a slave station according to the present invention, and includes a slave station input part 70 including a transceiving means 41, a management control data extracting means 42, an address extracting means 43, an address setting means 44, a management monitoring data transmitting means 46, a monitoring data transmitting means 47, an analog-to-digital (A/D) converter 48, an input means 49, and a low sensitivity detecting means 50, and the input part 9 as illustrated in FIG. 4. The input slave station 7 of this embodiment includes a MCU standing for a micro computer control unit as an internal circuit, and the MCU functions as a slave station input part 70. A calculation or storage necessary in processing is performed using a central processing unit (CPU), a random access memory (RAM), and a read only memory (ROM) equipped in the MCU (hereinafter, an "MCU 70"), but illustration of a relation among the CPU, the RAM, and the ROM in processing of the components configuring the slave station input part 70 is omitted for convenience of description.

The transceiving means 41 receives the transmission clock signal to be transmitted to the common data signal lines DP and DN, and transfers the transmission clock signal to the management control data extracting means 42, the address extracting means 43, and the management monitoring data transmitting means 46. The management control data extracting means 42 extracts data of the management control data signal from the management data region of the transmission clock signal, and transfers the extracted data to the low sensitivity detecting means 50. Meanwhile, the address extracting means 43 counts a pulse, starting from the start signal ST indicating the beginning of the transmission clock signal, and transfers the control data signal to the monitoring data transmitting means 47 at a timing at which the count value is identical to its own station address data set by the address setting means 44.

The monitoring data transmitting means 47 turns on or off a base current of a transistor TR based on serial data transferred from the input means 49 at a timing at which the control data signal is transferred from the address extracting means 43. In a case in which the base current is turned "on," the transistor TR is turned "on," and a current signal serving as the monitoring data signal is output to the data signal lines DP and DN. In this embodiment, as illustrated in FIG. 7, in a case in which the data value of the monitoring data signal is "1," an electric current (for example, 30 mA) of a predetermined value Ith or more is assumed to flow. Thus, for example, the monitoring data for the addresses 0 (#ad0), 1 (#ad1), 2 (#ad2), and 3 (#ad3) of the signal illustrated in FIG. 7 are indicated by "0," "0," "1," and "0." Further, the data transferred from the input means 49 to the monitoring data transmitting means 47 is data obtained by performing A/D conversion on the input signal transferred from the input part 9 through the A/D converter 48, and is based on a current signal or a voltage signal indicating "on" or "off" of the switch, for example, when an on-off switch is connected as the input part 9.

The management monitoring data transmitting means 46 counts a pulse, starting from the start signal ST of the transmission clock signal to obtain a timing of the management data region. Further, based on the data transferred from the low sensitivity detecting means 50, the management monitoring data transmitting means 46 outputs the base current of the transistor TR, and outputs the current signal serving as the management monitoring data signal to the data signal lines DP and DN.

Figure 5:
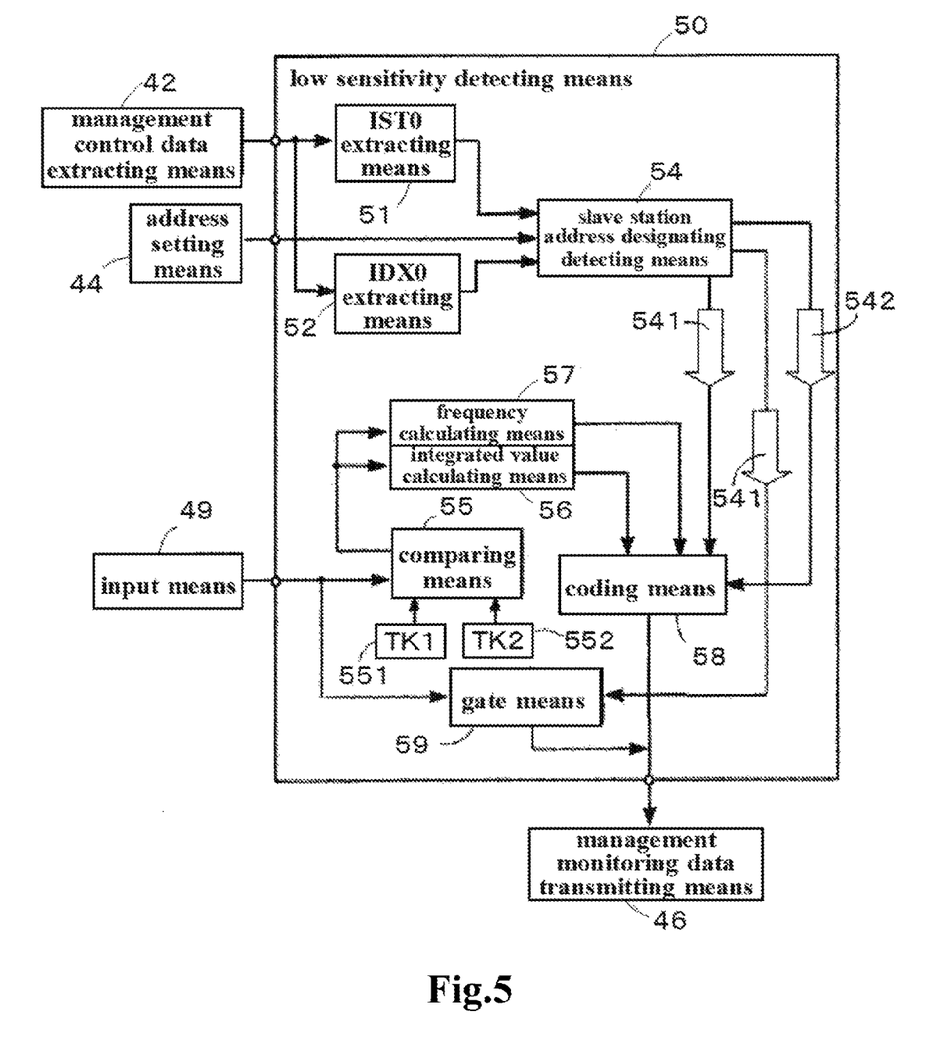
FIG. 5 is a system configuration diagram of a low sensitivity detecting means.

The low sensitivity detecting means 50 includes an ISTo extracting means 51, an IDXo extracting means 52, a slave station address designation detecting means 54, a comparing means 55, a lower limit threshold value storage means (TK1) 551, an upper limit threshold value storage means (TK2) 552, an integrated value calculating means 56, a frequency calculating means 57, an coding means 58, and a gate means 59 as illustrated in FIG. 5.

The ISTo extracting means 51 extracts the first management control data ISTo from the data of the management control data signal transferred from the management control data extracting means 42, and transfers the first management control data ISTo to the slave station address designation detecting means 54. The IDXo extracting means 52 extracts the second management control data IDXo from the data of the management control data signal transferred from the management control data extracting means 42, and transfers the second management control data IDXo to the slave station address designation detecting means 54. Further, its own station address data is transferred from the address setting means 44 to the slave station address designation detecting means 54.

The slave station address designation detecting means 54 transfers error monitoring command data 542 to the coding means 58 in a case in which the first management control data ISTo is data indicating an error monitoring command to request the number of the low sensitivity states of the input signal. Further, the slave station address designation detecting means 54 compares the second management control data IDXo with the data value of its own station address, and transfers the error monitoring command data 542 to the coding means 58 if the second management control data IDXo is identical to the data value of its own station address and is data indicating the error monitoring command to instruct monitoring of the low sensitivity state of the input signal. Further, the slave station address designation detecting means 54 transfers input monitoring command data 543 to the gate means 59 when the first management control data ISTo is data indicating an input monitoring command to instruct monitoring of the input signal or data indicating a disconnection detection command of the transmission line.

The comparing means 55 detects an abnormal state of the input signal by comparing the signal level of the serial data transferred from the input means 49 with a lower limit threshold value which is set in advance and registered to the lower limit threshold value storage means (TK1) 551 and an upper limit threshold value which is set in advance and registered to the upper limit threshold value storage means (TK2) 552. As the lower limit threshold value, a value in which "off" (or "on") of an input level by low sensitivity is determined to be an abnormal state when the signal level of the serial data is larger than the lower limit threshold value is set, whereas as the upper limit threshold value, a value in which "on" (or "off") of an input level by low sensitivity is determined to be an abnormal state when the signal level of the serial data is smaller than the upper limit threshold value is set. When the occurrence of the abnormal state is determined based on the comparison result, the comparing means 55 outputs a signal indicating the determination of the abnormal state to the integrated value calculating means 56 and the frequency calculating means 57.

The integrated value calculating means 56 calculates an integrated value of the number of determinations of the abnormal state by the comparing means 55 based on an output signal from the comparing means 55. Then, if the calculated integrated value exceeds a previously set first threshold value, the signal level of the serial data transferred from the input means 49 is determined to be the low sensitivity state. When the occurrence of the low sensitivity state is determined, the frequency calculating means 56 outputs integration error information indicating that the occurrence of the low sensitivity state has been determined due to an integrated value error and integrated value data of the number of determinations of the abnormal state by the comparing means 55 to the coding means 58. Meanwhile, when the occurrence of the low sensitivity state has not been determined, information indicating a normal state is output to the coding means 58.

The frequency calculating means 57 calculates the number of determinations of the abnormal state by the comparing means 55 per predetermined period of time, that is, the frequency at which the occurrence of the abnormal state has been determined by the comparing means 55 based on the output signal from the comparing means 55. Then, if the calculated frequency exceeds a previously set second threshold value, the signal level of the serial data transferred from the input means 49 is determined to be the low sensitivity state. When the occurrence of the low sensitivity state is determined, the frequency calculating means 57 outputs frequency error information indicating that the occurrence of the low sensitivity state has been determined due to a frequency error and frequency data indicating the frequency at which the occurrence of the abnormal state has been determined by the comparing means 55 to the coding means 58. Meanwhile, when the occurrence of the low sensitivity state has not been determined, information indicating a normal state is output to the coding means 58.

When the error monitoring command data 542 is transferred from the slave station address designation detecting means 54, the coding means 58 converts data output from the frequency calculating means 56 and the integrated value calculating means 57 into predetermined coding data based on the second management control data IDXo transferred from the slave station address designation detecting means 54, that is, address matching data 541, and transfers the coding data to the management monitoring data transmitting means 46.

When the input monitoring command data 543 is transferred from the slave station address designation detecting means 54, the gate means 59 transfers monitoring signal data of the input signal level to the management monitoring data transmitting means 46 based on the serial data transferred from the input means 49.

Next, a process of the method for detecting abnormality of the input signal in the control/monitoring signal transmission system having the above-described configuration will be described.

The IDX address data table of FIG. 7 is assumed to be already created and stored in the management data part 22. At each transmission cycle including the start signal ST and the control/monitoring data region and the management data region subsequent thereto, the head addresses allocated to all the slave stations 4, 6, and 7 are sequentially designated according to the second management control data IDXo.

The control part 1 outputs the management control data 14 to instruct detection of a disconnection of the transmission line or detection of the low sensitivity state to the master station 2 at an appropriately set timing or in response to any input instructions by the user. The master station 2 that has received the management control data 14 outputs the first management control data ISTo to request disconnection detection of the transmission line or information indicating the presence or absence of the low sensitivity and the second management control data IDXo designating any one of data included in a data group stored in the IDX address table.

The designating of data of the IDX address table according to the second management control data IDXo is performed using a table number. In other words, first, index address data (#ad0) of a table number 1 is selected and output as the second management control data IDXo. Further, a sequential change to the head address data corresponding to each table number is performed at each transmission cycle. Here, there is no limitation to the order in which data of the IDX address table is designated according to the second management control data IDXo, and, for example, a priority order may be given according to a function.

Each of the slave stations 4, 6, and 7 causes the management monitoring data signal to be superimposed on the management monitoring data region using the integration error information or the frequency error information indicating the error type of the low sensitivity state or information indicating the normal state as the first management monitoring data STi if the second management control data IDXo is identical to its own station address and the low sensitivity state or the normal state is detected in the integrated value calculating means 56 or the frequency calculating means 57. Each of the slave stations 4, 6, and 7 causes the management monitoring data signal to be superimposed on the management monitoring data region using the monitoring signal data of the input signal level obtained from the input means 49 through the gate means 59 at a timing of the input monitoring command data 543 as the second management monitoring data IDXi if the second management control data IDXo is identical to its own station address. Upon receiving the management monitoring data signal, the master station 2 extracts the first management monitoring data 16 and the second management monitoring data 17 from the management monitoring data signal, and transfers the first management monitoring data 16 and the second management monitoring data 17 to the control part 1.

The control part 1 performs predetermined processing according to content of the first management monitoring data 16 and the second management monitoring data 17. Specifically, when the first management monitoring data 16 is the integration error information or the frequency error information indicating the error type, the control part 1 performs a display indicating abnormality. Further, when the first management monitoring data 16 is the information indicating the normal state, the control part 1 does not perform a display indicating abnormality. Further, the control part 1 extracts the monitoring signal data of the input signal level which is the second management monitoring data 17, and performs a monitoring display. When the first management monitoring data 16 is the integration error information indicating the error type, the control part 1 transmits the management control data 14 to the master station 2 using the error monitoring command data to request the integrated value data which is the number of the low sensitivity states as the first management control data ISTo. Meanwhile, when the first management monitoring data 16 is the frequency error information indicating the error type, the control part 1 transmits the management control data 14 to the master station 2 using the error monitoring command data to request the frequency data which is the number of the low sensitivity states as the first management control data ISTo.

Then, upon receiving the management control data 14 to request the integrated value data or the frequency data from the control part 1, the master station 2 transmits the transmission signal to the common data signal lines DP and DN using the error monitoring command data to request the integrated value data or the frequency data indicating the number of the low sensitivity states as the first management control data ISTo and using the address used for identifying the slave stations 4, 6, and 7 that has transmitted the first management monitoring data STi indicating the abnormal state as the designated second management control data IDXo.

When the first management control data ISTo is data indicating the error monitoring command data indicating the number of the low sensitivity states of the input signal, each of the slave stations 4, 6, and 7 connected to the common data signal lines DP and DN compares the second management control data IDXo with the data value of its own station address. Then, if the second management control data IDXo is identical to the data value of its own station address, the integrated value data or the frequency data indicating the number of the low sensitivity states of the input signal and the error type data of the integrated value data or the frequency data are superimposed on the management monitoring data region as the second management monitoring data IDXi and the first management monitoring data STi, respectively, according to the type of data indicating the error monitoring command, and then the transmission signal is transmitted to the common data signal lines DP and DN. Upon receiving the transmission signal, the master station 2 extracts the first management monitoring data 16 and the second management monitoring data 17 from the management monitoring data signal, and transfers the first management monitoring data 16 and the second management monitoring data 17 to the control part 1.

The control part 1 performs predetermined processing according to content of the first management monitoring data 16. Specifically, when the first management monitoring data 16 indicates the abnormal state, a display indicating abnormality is performed. Further, when the management monitoring data is "0," the occurrence of a disconnection of the common data signal line is determined and displayed.

Through the above-described process, the control part 1 can detect the presence or absence of the low sensitivity state on each of the slave stations 4, 6, and 7. Further, when the low sensitivity state is detected, since it is possible to detect the integrated value of the number of determinations of the abnormal state by the comparing means 55 or the frequency at which the abnormal state is determined by the comparing means 55, it is possible to identifying a fact causing the low sensitivity state according to content of the data to some extent.

Furthermore, the lower limit threshold value, the upper limit threshold value, the first threshold value, and the second threshold value may be changed by the control unit side, as needed. In this case, preferably, data indicating that the lower limit threshold value, the upper limit threshold value, the first threshold value, and the second threshold value are changed and data of the changed lower limit threshold value, the changed upper limit threshold value, the changed first threshold value, and the changed second threshold value are superimposed on the management control data region and extracted by the slave stations 4, 6, and 7.

EXPLANATIONS OF LETTERS OR NUMERALS

1 control part
2 master station
4 input/output slave station
5 controlled device
6 output slave station
7 input slave station
8 output part
9 input part
11 output unit
12 input unit
13 control data
14 management control data
15 monitoring data signal data
16 first management monitoring data
17 second management monitoring data
18 management determining means
21 output data part
22 management data unit
23 timing generating part
24 master station output part
25 master station input part
26 input data part
29 memory
31 OSC (oscillation circuit)
32 timing generating means
33 control data generating means
34 line driver
35 monitoring signal detecting means
36 monitoring data extracting means
37 input data
39 management monitoring data
40 slave station input/output part
41 transceiving means
42 management control data extracting means
43 address extracting means
44 address setting means
46 management monitoring data transmitting means
47 monitoring data transmitting means
48 A/D converter
49 input means
50 low sensitivity detecting means
51 ISTo extracting means
52 IDXo extracting means
54 slave station address designation detecting means
541 address matching data
542 error monitoring command data
543 input monitoring command data
55 comparing means
551 lower limit threshold value storage means (TK1)
552 upper limit threshold value storage means (TK2)
56 integrated value calculating means
57 frequency calculating means
58 coding means
59 gate means
60 slave station output part
61 control data extracting means
62 output means
70 slave station input part
71 input means
80 output unit-integrated slave station
90 input unit-integrated slave station
TR transistor

What is claimed is:

1. A method for detecting abnormality of an input signal in a control/monitoring signal transmission system in which a master station is connected with a plurality of slave stations via a common data signal line, and transmission of data is performed according to a transmission synchronization scheme, the method comprising:

determining, by the slave station, occurrence of an abnormal state when data corresponding to a signal level of an input part is larger than a lower limit threshold value and smaller than an upper limit threshold value, wherein the lower limit threshold value and the upper limit threshold value are updated based on data transmitted from the master station;

detecting, by the slave station, a low sensitivity state of a signal of the input part based on the determination result of the abnormal state; and superimposing data indicating the low sensitivity state, data corresponding to the signal level of the input part and data indicating a number of determinations of the abnormal state on a management data region in a transmission signal to be transmitted to the common data signal line by the slave station, the management data region being different from a control/monitoring data region comprising data of a control data signal and data of a monitoring data signal.

2. The method for detecting abnormality of the input signal according to claim 1, wherein the slave station determines occurrence of the low sensitivity state if an integrated value of the number of determinations of the abnormal state is larger than a first threshold value, wherein the first threshold value is updated based on data transmitted from the master station.

3. The method for detecting abnormality of the input signal according to claim 1, wherein the slave station determines occurrence of the low sensitivity state if the number of determinations of the abnormal state per predetermined period of time is larger than a second threshold value, wherein the second threshold value is updated based on data transmitted from the master station.

4. The method for detecting abnormality of the input signal according to claim 2,
wherein when the low sensitivity state of the signal of the input part is detected, the slave station transmits the transmission signal in which a signal comprising data indicating a normal state or a type of an error determined to be the low sensitivity state and data corresponding to the signal level of the input part is superimposed on the management data region to the master station.

5. The method for detecting abnormality of the input signal according to claim 1,
wherein the management data region comprises a management control data region on which data from the master station is superimposed and a management monitoring data region on which data from the slave station is superimposed, data other than "0" is used as data from the slave station to be superimposed on the management monitoring data region when the low sensitivity state is detected, and disconnection of the common data signal line is determined if data extracted from the management monitoring data region in the master station is "0".

6. A slave station connected to the common data signal line to which the master station is connected, comprising:
a management control data extracting means for extracting management control data which is superimposed on a management data region by the master station, the management data region being different from a control/monitoring data region comprising data of a control data signal and data of a monitoring data signal and data of a monitoring data signal in a transmission signal transmitted via a common data signal line;
a management monitoring data transmitting means for causing a management monitoring data signal to be superimposed on the management data region as information from the slave station; and
a low sensitivity detecting means for determining occurrence of an abnormal state in a case in which data corresponding to a signal level of an input part is larger than a lower limit threshold value and smaller than an upper limit threshold value, wherein the lower limit threshold value and the upper limit threshold value are updated based on data transmitted from the master station, and wherein the low sensitivity detecting means includes gate means for outputting data corresponding to the signal level of the input part, and coding means for coding data indicating the low sensitivity state and data indicating a number of determinations of the abnormal state into coding data and outputting the coding data to the management monitoring data transmitting means.

7. The method for detecting abnormality of the input signal according to claim 4,
wherein the management data region comprises a management control data region on which data from the master station is superimposed and a management monitoring data region on which data from the slave station is superimposed, data other than "0" is used as data from the slave station to be superimposed on the management monitoring data region when the low sensitivity state is detected, and disconnection of the common data signal line is determined if data extracted from the management monitoring data region in the master station is "0".

8. The method for detecting abnormality of the input signal according to claim 3,
wherein when the low sensitivity state of the signal of the input part is detected, the slave station transmits the transmission signal in which a signal comprising data indicating a normal state or a type of an error determined to be the low sensitivity state and data corresponding to the signal level of the input part is superimposed on the management data region to the master station.

9. The method for detecting abnormality of the input signal according to claim 2,
wherein the management data region comprises a management control data region on which data from the master station is superimposed and a management monitoring data region on which data from the slave station is superimposed, data other than "0" is used as data from the slave station to be superimposed on the management monitoring data region when the low sensitivity state is detected, and disconnection of the common data signal line is determined if data extracted from the management monitoring data region in the master station is "0".

10. The method for detecting abnormality of the input signal according to claim 3,
wherein the management data region comprises a management control data region on which data from the master station is superimposed and a management monitoring data region on which data from the slave station is superimposed, data other than "0" is used as data from the slave station to be superimposed on the management monitoring data region when the low sensitivity state is detected, and disconnection of the common data signal line is determined if data extracted from the management monitoring data region in the master station is "0".

* * * * *